United States Patent Office 3,297,852
Patented Jan. 10, 1967

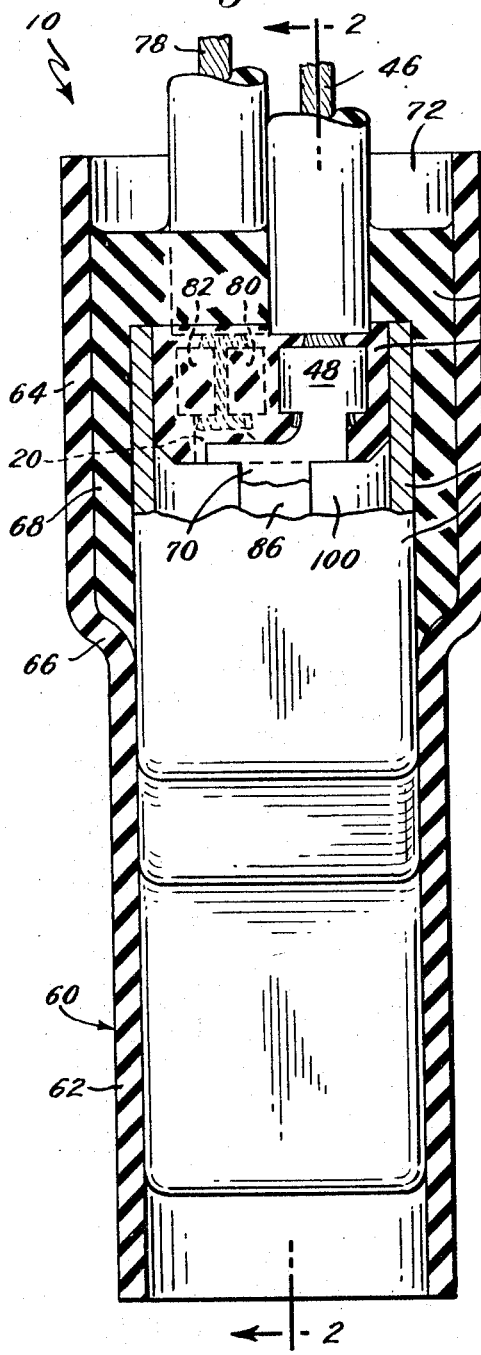
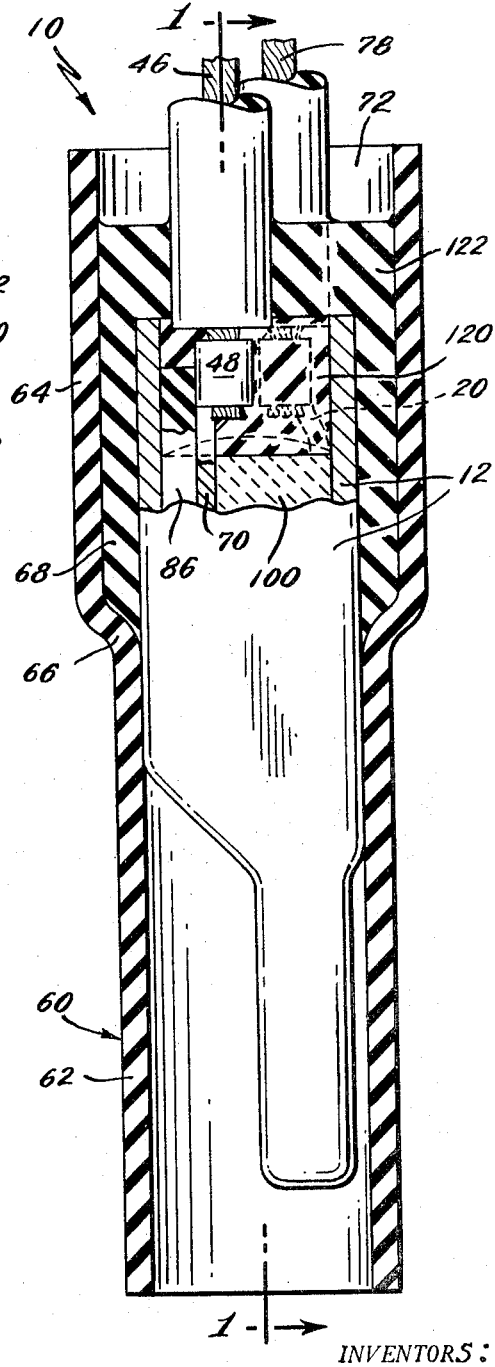
INVENTORS:
WALTER H. MOKSU,
HARRY A. CORBETT,
BY John A. Haug ATT'Y.

3,297,852
ELECTRIC SWITCH SEAL
Walter H. Moksu and Harry A. Corbett, both of Attleboro, Mass., assignors to Texas Instruments Incorporated, Dallas, Tex., a corporation of Delaware
Filed Oct. 6, 1965, Ser. No. 493,457
5 Claims. (Cl. 200—168)

This invention relates to thermally responsive electrical switches and more particularly to such switches which are useful as overload protectors for electric motors.

Switches of the type disclosed in United States Patent No. 3,104,296, issued September 17, 1963 assigned to the assignee of the invention, have regularly been used by motor manufacturers for use as overload protectors. These switches are embedded in the windings of the motors which are then impregnated with varnish or like material as a step in the manufacture of the motors. Due to the low viscosity of the varnish during the process of impregnating, leakage problems have been encountered wherein the varnish in some cases leaks through the switch seal thereby deleteriously effecting the calibration of the switch and preventing the switch from operating as designed. It has been determined that the varnish permeates the bond between the switch casing and the potting compound used to seal the switch.

In United States Patent No. 3,213,246, issued October 19, 1965, assigned to the assignee of this invention, there is disclosed a heat shrinkable, thermoplastic resin sleeve in which is telescopically received a switch in such a manner that a portion of the sleeve extends beyond one end of the switch casing (the end through which the terminals extend) to provide a pocket. The assembly is heated to shrink the sleeve about the switch and then the pocket is infilled with a thermally conductive, electrically insulating thermosetting resin material. The function of this material, as explained in the patent, is to provide a rigid encapsulation of the switch thereby protecting the fragile seal of the switch. This is particularly useful with switches employing glass seals since the encapsulation acts as a stress reliever and prevents damage to the glass by distributing any forces acting on the switch leads and header assembly to the entire switch casing. We have atempted to use this type of seal to remedy the leakage problem set forth, supra, however varnish still leaked into the switches.

Accordingly, among the several objects of the present invention may be noted the provision of means which will obviate or at least minimize the problems described above; the provision of such means which will not effect any substantial increase in overall dimension of the device; in the provision of such means which embodies a minimum number of parts, and which is simple and economical to assemble and manufacture.

It is an object of the present invention, then, to provide a thermally responsive electric switch with an improved seal.

It is another object to provide an improved seal on a switch which is particularly useful as an overload protector for an electric motor.

Another object is to provide a thermostatic switch employing a seal which is effective to prevent leakage of varnish or the like used to impregnate motors during manufacture thereof, yet which is simple in structure, inexpensive to manufacture and not otherwise effecting the operation and calibration of the switch.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of the various possible embodiments of the invention is illustrated:

FIG. 1 is a sectional view taken on lines 1—1 of FIG. 2 with some parts broken away, of an exemplary miniaturized sealed electrical device in the form of a thermally responsive electrical switch to which the present invention is applicable;

FIG. 2 is a sectional view of the sealed switch illustrated in FIG. 1 taken along the lines 2—2 of FIG. 1.

Similar reference characters indicate corresponding parts throughout the several views of the drawing.

Dimensions of certain of the parts as shown in the drawings may have been modified and/or exaggerated for the purposes of clarity of illustration.

Briefly, according to the present invention, a sleeve which acts as a mold member is disposed about the electrical terminal (or terminals), the internal seal and the electrical device to be sealed. The sleeve or mold member confines a potting material, for example, an electrically insulating thermosetting resin material, which is infilled into the mold cavity provided by the member, and which material when it hardens provides an improved seal by means of an elongated, tortuous leakage path.

Referring now to FIGS. 1 and 2 there is shown an exemplary electrical switching device generally designated by numeral 10 to which the present invention is applicable. Device 10 may take the form of a thermally responsive electrical switch such as that shown and described in U.S. Patent No. 3,104,296 referred to supra. Reference may be had to this patent for specific details of construction of the exemplary switch shown in FIGS. 1 and 2. Generally, thermally responsive switch 10 comprises a can or tubular casing member 12 closed at one end and open at the other end, as shown. Casing 12 is preferably metallic and formed of a good electrically and thermally conductive material, such as, for example, steel, aluminum or copper. Thermostat 10 is provided with an upper electrically conducting terminal 20 formed of electrically conducting material such as Monel, tin plated, cold rolled, or stainless steel. Thermostat 10 is also provided with a lower or stationary terminal 70 which may take the form of a conventional contact material and comprise, for example, an upper layer of silver or silver alloy bonded or otherwise adhered to a base layer of cold rolled steel. Stationary terminal 70 is also provided with a wire clinch type locking means or electrical connection to lead 78, and may comprise wing portions 80 and 82 which are adapted to be bent and clinched around wire lead 78; upper terminal 20 is provided with similar wire clinch-type locking means comprising wing portions 47 (not shown) and 48 providing a low cost and simple fastening method, eliminating a costly and tedious welding operation. It will be noted that stationary terminal 70 is maintained in space electrically insulated relation to can 12 by insulator 86 which may be constructed of a conventional insulating material such as, for example, a strip of glass silicon laminate or steatite.

The upper terminal 20, stationary terminal 70 and insulator 86 are aligned and maintained in a fixed, spaced, electrically insulated, assembled relation to each other within can 12 by header means 100, which may be formed of any suitable electrically insulating material, as shown on the drawing, header member 100 is formed of a ceramic material. Header 100 is complementary in shape to the interior cross-sectional shape of can 12 and is dimensioned so as to provide a sliding fit therebetween when a thermostatic assembly is slidably inserted into can 12; this sliding fit serves to maintain the thermostatic asssembly in fixed assembled relation within can 12 and also forms a stop or a seal to prevent epoxy 120, which will be described below, from leaking into the interior of the can into the thermostatic assembly.

It will be understood from a reading of the above-referred-to patent that in the described exemplary device the thermostatic assembly which is inserted into can 12 includes a thermostatic, snap-acting element 30 (not shown) mounting a contact 38 (not shown) which is adapted to move into and out of engagement with stationary contact 70. Thermostatic element 30 is in turn mounted in cantilever fashion from a portion (not shown) of upper terminal 20.

After the components of the thermostatic assembly have been assembled into fixed relation and have been slidably inserted into can 12, an electrically insulating layer of adhesive compound 120, which may, for example, take the form of an electrically insulating, thermosetting resin or epoxy potting compound, is introduced into the open end of can 12. The potting compound 120 serves to mount, seal and maintain the thermostat subassembly in fixed assembled position within the can or housing 12.

Thermostat 10 is telescopically received in sleeve 60 which is formed of an electrically insulating material such as polyethylene terephthalate resin. Sleeve 60 is formed of two portions 62 and 64. Portion 62 closely conforms to the periphery of can 12; portion 64 of sleeve 60 has a larger cross-sectional area than portion 62 and is joined thereto at 66. As is clearly shown in the drawings the open end of can 12 is located intermediate the ends of portion 64 and forms with the sleeve an annular space 68. Can 12 and sleeve portion 64 form a cavity 72, including space 68, which is infilled through the open end thereof with a thermally conductive, electrically insulating, thermosetting resin material 122 which may be of the same type as material 120 mentioned above. This forms a double seal which, to be effective, it is imperative that potting material 122 extend beyond the open end of container can 12 forming an umbrella shaped seal with potting material 120.

With the construction of the instant invention it will be noted that in order for varnish or other material to leak into the can 12 it must follow an elongated tortuous path to get into the mouth of can 12. The material must travel between potting compound 122 and portion 64 axially to portion 66 and reverse the direction 180° and again travel axially to the open end of can 12 before it can work its way between potting compound 120 and can 12. We have found that this double seal with an elongated tortuous path has virtually eliminated all leakage problems which were formerly associated with impregnating a motor during manufacturer thereof.

We have found that we could employ a double sleeve to effect the same elongated tortuous leakage path by using a separate shrinkable sleeve for portion 62 and a non-shrinkable sleeve for portion 64 which is only slightly larger than portion 62 and is inserted thereover making a relatively tight double sleeve assembly.

In view of the above it will be seen that the several objects of the invention are achieved, and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A thermally responsive electric switch having a seal with an elongated leakage path comprising thermally responsive electric switching means disposed in a tubular casing having an open end through which at least one electrically conductive terminal member extends, electrically insulating resin material closing said open end, an elongated electrically insulating sleeve member having a first and second portion, said second portion having a larger cross-sectional area than said first portion, said casing telescopically received and closely fitting in said first portion, the open end of said casing located intermediate the ends of said second portion, said casing and said second portion defining therebetween an annular space, electrically insulating resin material located in said annular space between the switch casing and the said second portion of said sleeve member and extending beyond said open end of said casing thereby forming a tortuous, elongated leakage path to said switching means.

2. The combination according to claim 1 in which said sleeve member is constructed of polyethylene terephthalate resin.

3. An improved seal for an electric switch comprising: an elongated electrically insulating sleeve member having a first and second portion, said second portion having a larger cross-sectional area than said first portion, a thermally responsive switching means telescopically received and closely fitting in said first portion and having an open end, the open end of said thermally responsive switching means located intermediate the ends of said second portion, an umbrella shaped mass of electrically insulating resin material which fills in said open end of the said thermally responsive switching means and circumlocutes said open end filling in the space formed between said switching means and said second portion forming a tortuous, elongated leakage path to said switching means.

4. The combination according to claim 3 in which said sleeve member is constructed of polyethylene terephthalate resin.

5. A thermally responsive electric switch having a seal with an elongated leakage path including a tubular casing having an open and a closed end, said casing having therein a first electrically conductive terminal spaced from a second electrically conductive terminal, said first terminal having an end portion projecting exteriorly of said casing and electrically connected to an electrically conductive lead header means disposed adjacent the open end of said casing and maintaining said terminals in spaced electrically insulated relation; said header means interfitting with said open end of said casing to seal the interior of the switch against entry of sealing materials applied externally of the header means, electrically insulating resin material closing said open end; an elongated electrically insulating sleeve member having at least one open end and having a first and second portion, said second portion having a larger cross-sectional area than said first portion; said switch telescopically received and closely fitting in said first portion, said terminal member and lead disposed within said second portion of said sleeve member intermediate the ends thereof, with said header member, terminal member and lead disposed adjacent said open end of said sleeve, said open end of said sleeve extending beyond said header, terminal member and lead forming a pocket within which said terminal member is disposed, at least a portion of said pocket being infilled through said open end of said sleeve with an electrically insulating resin material, said resin material surrounding said terminal and circumlocuting said open end of said casing to provide a protective encapsulation and seal for said terminal lead and header whereby forces acting on said switch externally of said sleeve member are distributed to said casing thereby minimizing forces acting on said terminal lead and header and providing an elongated, tortuous leakage path to said switch, and said lead having a portion extending exteriorly of said sleeve through the open end thereof.

References Cited by the Examiner
UNITED STATES PATENTS

| | | | |
|---|---|---|---|
| 2,925,479 | 2/1960 | Marasco | 200—168 |
| 3,038,054 | 6/1962 | Naimer | 200—168 |

ROBERT K. SCHAEFER, *Primary Examiner.*

H. O. JONES, *Assistant Examiner.*